US 11,424,516 B2

(12) United States Patent
Haino et al.

(10) Patent No.: US 11,424,516 B2
(45) Date of Patent: Aug. 23, 2022

(54) BATTERY PACK AND PRODUCTION METHOD FOR SAME

(71) Applicant: SANYO Electric Co., Ltd., Daito (JP)

(72) Inventors: Masami Haino, Hyogo (JP); Koichi Muramatsu, Osaka (JP)

(73) Assignee: SANYO Electric Co., Ltd., Daito (JP)

(*) Notice: Subject to any disclaimer, the term of this patent is extended or adjusted under 35 U.S.C. 154(b) by 393 days.

(21) Appl. No.: 16/633,054

(22) PCT Filed: Jul. 23, 2018

(86) PCT No.: PCT/JP2018/027414
§ 371 (c)(1),
(2) Date: Jan. 22, 2020

(87) PCT Pub. No.: WO2019/021979
PCT Pub. Date: Jan. 31, 2019

(65) Prior Publication Data
US 2020/0235366 A1    Jul. 23, 2020

(30) Foreign Application Priority Data
Jul. 27, 2017  (JP) .............................. JP2017-145920

(51) Int. Cl.
*H01R 12/91*   (2011.01)
*H01M 50/528*  (2021.01)
(Continued)

(52) U.S. Cl.
CPC ..... *H01M 50/528* (2021.01); *H01M 10/4257* (2013.01); *H01R 12/91* (2013.01);
(Continued)

(58) Field of Classification Search
CPC . H01R 13/6675; H01R 13/6315; H01R 13/64
See application file for complete search history.

(56) References Cited

U.S. PATENT DOCUMENTS 5,144,217 A * 9/1992 Gardner .............. H01M 50/213
                                                        320/110
5,530,334 A * 6/1996 Ramspeck ............ H01M 10/46
                                                        361/600
(Continued)

FOREIGN PATENT DOCUMENTS

JP    H02-051616 A    2/1990
JP    H06-296773 A    10/1994
(Continued)

OTHER PUBLICATIONS

International Search Report dated Sep. 25, 2018, issued in counterpart application No. PCT/JP2018/027414, with English translation. (3 pages).

*Primary Examiner* — Truc T Nguyen
(74) *Attorney, Agent, or Firm* — WHDA, LLP

(57) ABSTRACT

A battery pack includes: a connector holder that is fixed to an exterior case and has a second main surface that faces an inside of the exterior case; a floating connector connected with a center of the connector holder in such a manner that the floating connector floats such that an orientation of the floating connector is variable upward, downward, leftward, and rightward; and a lead wire fixed to an inner surface of the floating connector. The lead wire extends through an inside of the exterior case. The Lead wire) connects the floating connector with a circuit board. The connector holder has a guide pipe on a second-main-surface side of connector holder. A shape of an edge of the guide pipe is a circle that has a cut-off portion. The cut-off portion has a radius of curvature that is larger than a radius of curvature of the circle.

10 Claims, 13 Drawing Sheets

(51) Int. Cl.
*H01M 10/42* (2006.01)
*H01R 13/516* (2006.01)
*H01R 43/20* (2006.01)

(52) U.S. Cl.
CPC ......... *H01R 13/516* (2013.01); *H01R 43/205* (2013.01); *H01M 2010/4271* (2013.01)

(56) References Cited

U.S. PATENT DOCUMENTS

| | | | |
|---|---|---|---|
| 10,249,854 B2* | 4/2019 | Beyerl | H01M 50/224 |
| 10,603,777 B2* | 3/2020 | Palich | B23D 45/044 |
| 2010/0221590 A1* | 9/2010 | Reber | B25F 5/02 |
| | | | 429/99 |
| 2010/0221594 A1* | 9/2010 | Ro kamp | A01G 3/053 |
| | | | 429/100 |
| 2016/0248097 A1* | 8/2016 | Jagannathan | H01M 4/627 |
| 2017/0279301 A1 | 9/2017 | Iwatsuki et al. | |
| 2018/0083237 A1* | 3/2018 | Wang | H01M 50/20 |
| 2020/0113317 A1* | 4/2020 | Okumi | A45F 3/04 |
| 2022/0098711 A1* | 3/2022 | Wang | C22C 33/006 |
| 2022/0102787 A1* | 3/2022 | He | H01M 10/625 |
| 2022/0104355 A1* | 3/2022 | Zhang | H05K 3/303 |

FOREIGN PATENT DOCUMENTS

| | | |
|---|---|---|
| JP | 2006-147115 A | 6/2006 |
| JP | 2008-251214 A | 10/2008 |
| JP | 2012-205371 A | 10/2012 |
| WO | 2014/162963 A1 | 10/2014 |
| WO | 2016/072041 A1 | 5/2016 |

* cited by examiner

BATTERY PACK AND PRODUCTION METHOD FOR SAME

TECHNICAL FIELD

The present invention relates to a battery pack and a production method for the battery pack.

BACKGROUND ART

Battery packs are widely used as power sources for electric tools, electric bicycles, electric motorcycles, hybrid electric vehicles, and electric vehicles, for example. Further, battery packs are widely used to store electricity at home and stores, for example. Such a battery pack includes a plurality of chargeable secondary-battery cells connected with each other in series and in parallel. Consequently, the battery pack is chargeable and dischargeable. For example, battery module 80 includes battery holder 82 that holds a plurality of battery cells 81, as illustrated in FIG. 11. Battery module 80 is disposed in waterproof container 83. Waterproof container 83 that contains battery module 80 is a core pack of a battery. Waterproof container 83 that contains battery module 80 is disposed in exterior case 84. In battery holder 82, the plurality of battery cells 81 are parallel to each other. Each of battery cells 81 has electrode terminals at both ends, respectively, of battery cell 81. In battery holder 82, the electrode terminals of battery cells 81 are arranged on planes. Lead sheets 85 are arranged on two sides, respectively, of battery holder 82. Lead sheets 85 connect the electrode terminals of battery cells 81 with each other.

Such a battery pack includes a connector used to electrically connect the battery pack with a device to which the battery pack supplies electrical energy. The device to which the battery pack supplies electrical energy is a load. The connector may include a floating mechanism that allows the connector to be easily connected with a device to which the battery pack supplies electrical energy (see PTLs 1 and 2, for example). The floating mechanism allows the connector to be movable, and allows an orientation of the connector to be slightly variable, as illustrated in a cross-sectional view of FIG. 12. Consequently, a position of the connector is vertically and laterally adjusted and an inclination of the connector is adjusted when the connector is connected with a device to which the battery pack supplies electrical energy. In such a floating mechanism, a lead wire electrically connects a floating connector with a battery module.

On the other hand, battery packs need to produce high power in recent years. Consequently, large electric current for charging or discharging flows through a lead wire of each of the battery packs. Therefore, resistances of the lead wires become lower, and thus diameters of the lead wires become larger. Consequently, the lead wires become less flexible. Consequently, a lead wire in some orientation or in some state may apply a force to a floating connector. For example, a lead wire connected with a floating connector may push the floating connector. That is to say, although a floating connector is used, the floating connector receives an external force from a lead wire connected with the floating connector. Consequently, the floating connector may become inclined from an original orientation. Further, even if an external force is applied to a floating connector, a restoring force of a floating mechanism naturally allows the floating connector to return to an original orientation after the external force vanishes. For example, even if a floating connector is pushed from an original orientation, a restoring force of a floating mechanism naturally allows the floating connector to return to an original orientation after the floating connector ceases to be pushed. However, a lead wire may push the floating connector, as described above. Consequently, the floating connector may not return to the original orientation. As described above, a lead wire connected with a floating connector may interfere with a floating function.

CITATION LIST

Patent Literature

PTL 1: WO 2016/072041 A1
PTL 2: Unexamined Japanese Patent Publication No. H2-51616

SUMMARY OF THE INVENTION

Technical Problems

The present invention is made in view of the above background. It is an object of the present invention to provide a battery pack that allows a lead wire to be less likely to interfere with a floating function of a floating connector, and a production method for the battery pack.

A battery pack according to a first aspect of the present invention includes: a battery module that includes at least one secondary-battery cell; an exterior case that holds the battery module and has an opening; a circuit board electrically connected with the secondary-battery cell of the battery module; a connector holder that is fixed to the exterior case and has two main surfaces that include a first main surface exposed through the opening of the exterior case, and a second main surface that is opposite the first main surface and faces an inside of the exterior case; a floating connector connected with a center of the connector holder in such a manner that the floating connector floats in such a manner that an orientation of the floating connector is variable upward, downward, leftward, and rightward, the floating connector having an exposed surface exposed by the exterior case, and the floating connector being able to be connected through the exposed surface with a device to which the battery pack supplies electrical energy; and a lead wire fixed to an inner surface of the floating connector that is opposite the exposed the exposed surface of the floating connector, the lead wire extending through an inside of the exterior case, and the lead wire connecting the floating connector with the circuit board. The connector holder has a guide pipe on a side of the second main surface of the connector holder, the guide pipe has a pipe shape, and the guide pipe surrounds the lead wire, and a shape of an edge of the guide pipe is a circle, has a cut-off portion, and the cut-off portion has a radius of curvature that is larger than a radius of curvature of the circle.

In the configuration of the battery pack according to the first aspect of the present invention, the lead wire passes through the guide pipe. Consequently, the guide pipe of the connector holder adjusts a position of the floating connector. Consequently, the floating connector is held at a center. Consequently, the lead wire is less likely to push the floating connector. Consequently, a floating function is less likely to be weakened. Consequently, the floating function is effective. Consequently, the battery pack is surely flexibly connected with a device to which the battery pack supplies electrical energy. The guide pipe of the connector holder adjusts a position of the floating connector. Consequently, the floating connector is held at a center. Further, the cut-off portion decreases an area of part of a surface of the lead wire that is in contact with an inner surface of the guide pipe through which the lead wire passes. Consequently, the lead wire is less likely to push the floating connector. Consequently, the floating function is less likely to be weakened. Further, friction between the lead wire and the guide pipe is less likely to weaken the floating function. Consequently, the floating function is effective. Consequently, the battery pack is surely flexibly connected with a device to which the battery pack supplies electrical energy.

A battery pack according to a second aspect of the present invention includes the configuration of the battery pack according to the first aspect of the present invention. Further, in the battery pack according to the second aspect of the present invention, the lead wire may be fixed to a center of the inner surface of the floating connector, and the lead wire may be perpendicular to the inner surface of the floating connector.

A battery pack according to a third aspect of the present invention includes the configuration of the battery pack according to the first or second aspect of the present invention. Further, in the battery pack according to the third aspect of the present invention, the cut-off portion may have a shape like a straight line or is curved.

A battery pack according to a fourth aspect of the present invention includes the configuration of the battery pack according to any one of the first to third aspects of the present invention. Further, in the battery pack according to the fourth aspect of the present invention, in the edge of the guide pipe, the cut-off portion is located at a side of the edge that is far from the circuit board.

Accordingly, the lead wire extends upward from the circuit board. Further, the lead wire is curved. The curved lead wire has a force that allows the curved lead wire to expand outward and become curved in a direction that is opposite the circuit board. In other words, the lead wire is in contact with part of an inner surface of the guide pipe that is far from the circuit board. In the configuration of the battery pack according to the fourth aspect of the present invention, the cut-off portion is made at the part of an inner surface of the guide pipe that is far from the circuit board. Consequently, the cut-off portion decreases resistance due to the contact. Consequently, floating operation becomes smooth.

A battery pack according to a fifth aspect of the present invention includes the configuration of the battery pack according to any one of the first to fourth aspects of the present invention. Further, in the battery pack according to the fifth aspect of the present invention, the cut-off portion of the edge of the guide pipe may be inclined in a direction in which the lead wire extends from the circuit board. Wiring of the lead wire that extends from the circuit board generates stress in the lead wire. The configuration of the battery pack according to the fifth aspect of the present invention allows the stress to act on the cut-off portion. Consequently, the cut-off portion decreases resistance due to the contact. Consequently, floating operation becomes smooth.

A battery pack according to a sixth aspect of the present invention includes the configuration of the battery pack according to any one of the first to fifth aspects of the present invention. Further, in the battery pack according to the sixth aspect of the present invention, the connector holder may have a frame, the frame may adjoin the guide pipe, the frame may have an inner diameter that is larger than an inner diameter of the guide pipe, and the frame may surround the floating connector.

A battery pack according to a seventh aspect of the present invention includes the configuration of the battery pack according to any one of the first to sixth aspects of the present invention. Further, in the battery pack according to the seventh aspect of the present invention, the connector holder may have a fixing portion that allows the connector holder to be inserted into the opening of the exterior case from an inside of the exterior case, and is used to fix the connector holder to the opening of the exterior case from an inside of the exterior case. The configuration of the battery pack according to the seventh aspect of the present invention does not need a relay connector. The relay connector is necessary if the connector holder is fixed to the exterior case from an outside of the exterior case. Therefore, the lead wire is preliminarily welded to the floating connector. Then the lead wire welded to the floating connector is directly connected with the circuit board.

A battery pack according to an eighth aspect of the present invention includes the configuration of the battery pack according to any one of the first to seventh aspects of the present invention. Further, in the battery pack according to the eighth aspect of the present invention, the lead wire may include a plurality of wires.

A battery pack according to a ninth aspect of the present invention includes the configuration of the battery pack according to any one of the first to eighth aspects of the present invention. Further, in the battery pack according to the ninth aspect of the present invention, a tape that has a smooth surface may be wound around the lead wire. In the configuration of the battery pack according to the ninth aspect of the present invention, the lead wire around which the tape is wound moves more smoothly on the guide pipe. Consequently, frictional resistance decreases. Consequently, the lead wire is less likely to push the floating connector. Consequently, the lead wire is less likely to interfere with a floating mechanism. Further, if a plurality of lead wires are used, the plurality of lead wires are tied into a bundle with the tape. Consequently, the plurality of tied lead wires smoothly move on the guide pipe.

A production method for a battery pack according to a tenth aspect of the present invention is a method for producing a battery pack. The battery pack includes: a battery module that includes at least one secondary-battery cell; an exterior case that holds the battery module and has an opening; a circuit board electrically connected with the secondary-battery cell of the battery module; a connector holder that is fixed to the exterior case and has two main surfaces that include a first main surface exposed through the opening of the exterior case, and a second main surface that is opposite the first main surface and faces an inside of the exterior case; a floating connector connected with the connector holder in such a manner that the floating connector floats in such a manner that an angle of the floating connector is variable, the floating connector being able to be connected with a device to which the battery pack supplies electrical energy; and a lead wire that extends through an inside of the exterior case, and connects the floating connector with the circuit board.

The production method for a battery pack according to the tenth aspect of the present invention includes arranging the battery module and the circuit board in the exterior case, inserting the lead wire that extends from the circuit board into a guide pipe having a pipe shape, the guide pipe being formed on a side of the second main surface of the connector holder, a shape of an edge of the directing tube being a circle that has a cut-off portion having a radius of curvature that is larger than a radius of curvature of the circle, connecting the lead wire that has been inserted into the guide pipe with the floating connector, inserting the connector holder into the opening of the exterior case from an inside of the exterior case to fix, closing the exterior case.

Consequently, the lead wire passes through the guide pipe. Consequently, the guide pipe of the connector holder adjusts a position of the floating connector. Consequently, the floating connector is held at a center. Consequently, the lead wire is less likely to push the floating connector. Consequently, the floating function is less likely to be weakened. Consequently, the floating function is effective. Consequently, the battery pack is surely flexibly connected with a device to which the battery pack supplies electrical energy.

DESCRIPTION OF EMBODIMENT

Hereinafter, an exemplary embodiment of the present invention will be described with reference to the drawings. However, the exemplary embodiment described below is an example that allows a technical idea of the present invention to be embodied, and the present invention is not limited to the exemplary embodiment described below. The present description never limits components recited in the claims to components in the exemplary embodiment. It is especially intended that sizes, materials, and shapes of components, and arrangements of the components that are described in the exemplary embodiment do not limit the scope of the present invention, unless otherwise specified. The sizes, materials, and shapes of components, and arrangements of the components that are described in the exemplary embodiment are mere examples for explanation. Sizes of components and positional relation between components in each of the drawings may be exaggerated for clear explanation. Furthermore, in the following description, same names or same reference marks denote same components or same types of components, and detailed description is therefore appropriately omitted. Furthermore, one component may function as a plurality of elements of the present invention. Alternatively, a function of one component may be performed by a plurality of components.

First Exemplary Embodiment

Figure 1:
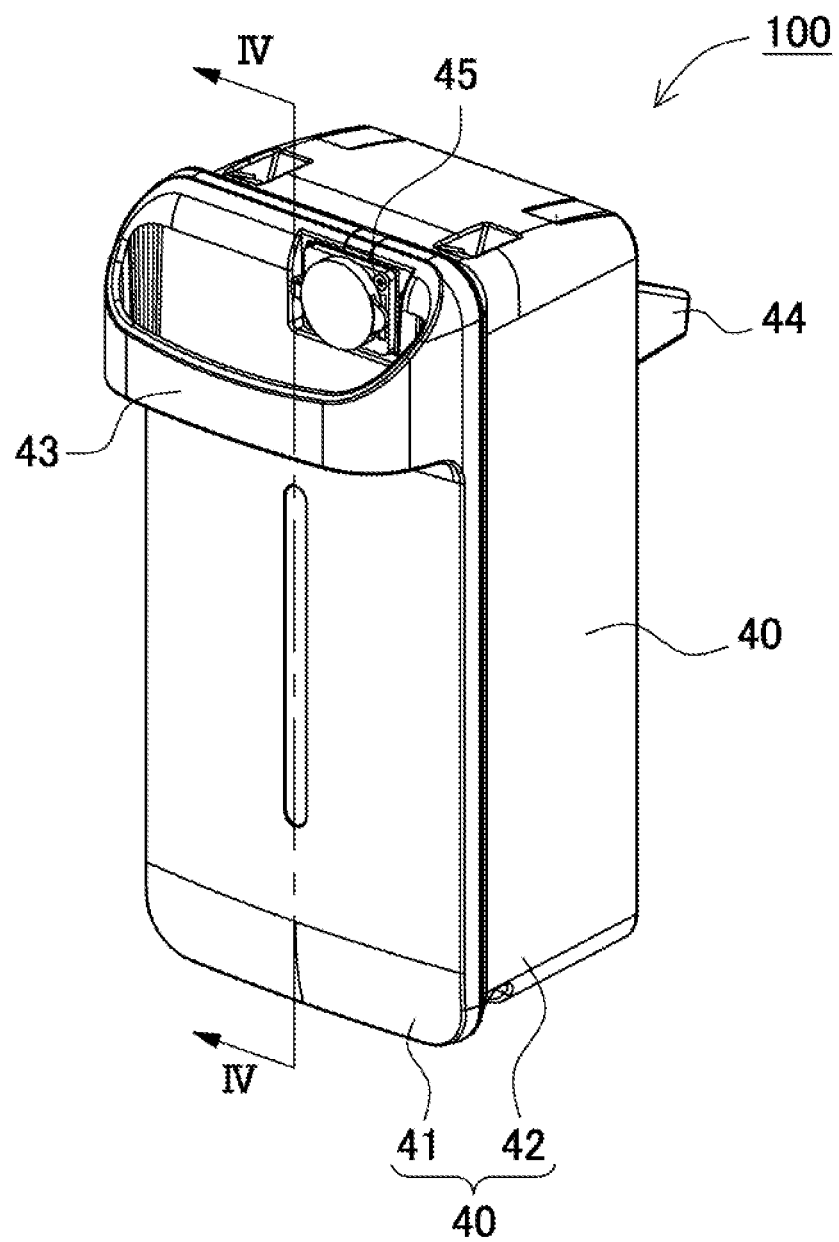
FIG. 1 is a perspective view that illustrates an appearance of a battery pack according to a first exemplary embodiment.
Figure 2:
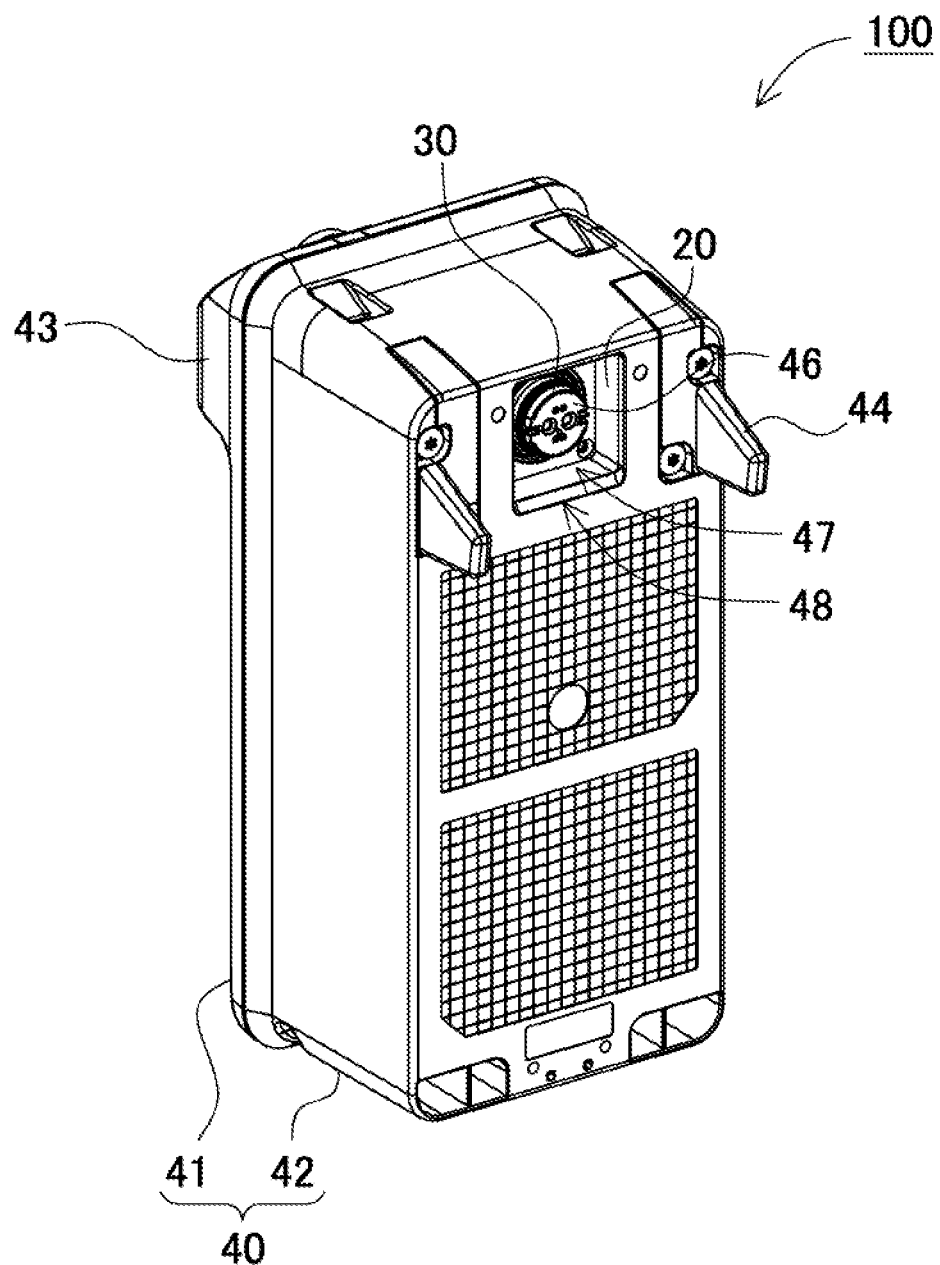
FIG. 2 is a back perspective view of an appearance of the battery pack in FIG. 1.
Figure 3:
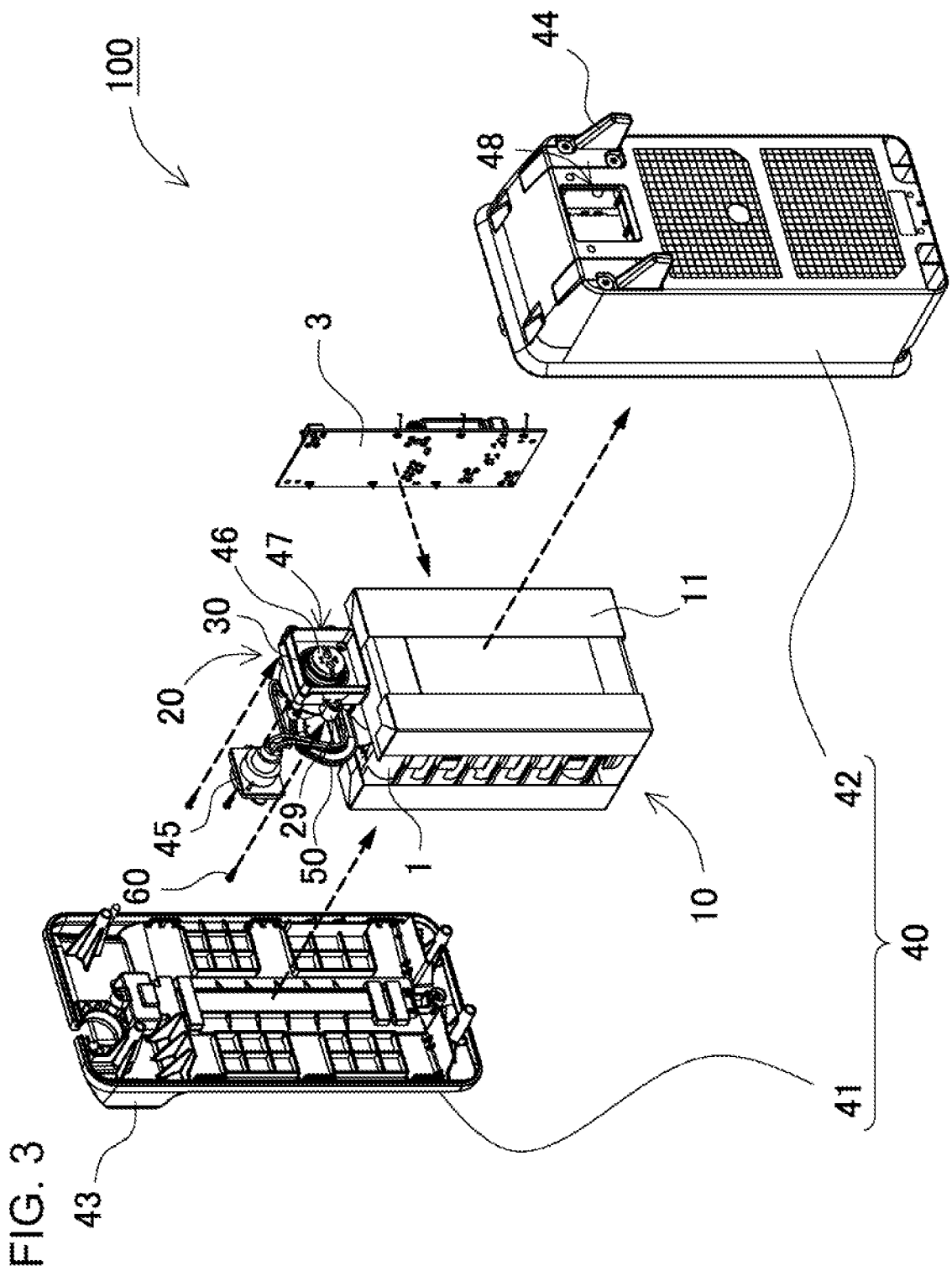
FIG. 3 is an exploded perspective view of the battery pack in FIG. 2.
Figure 4:
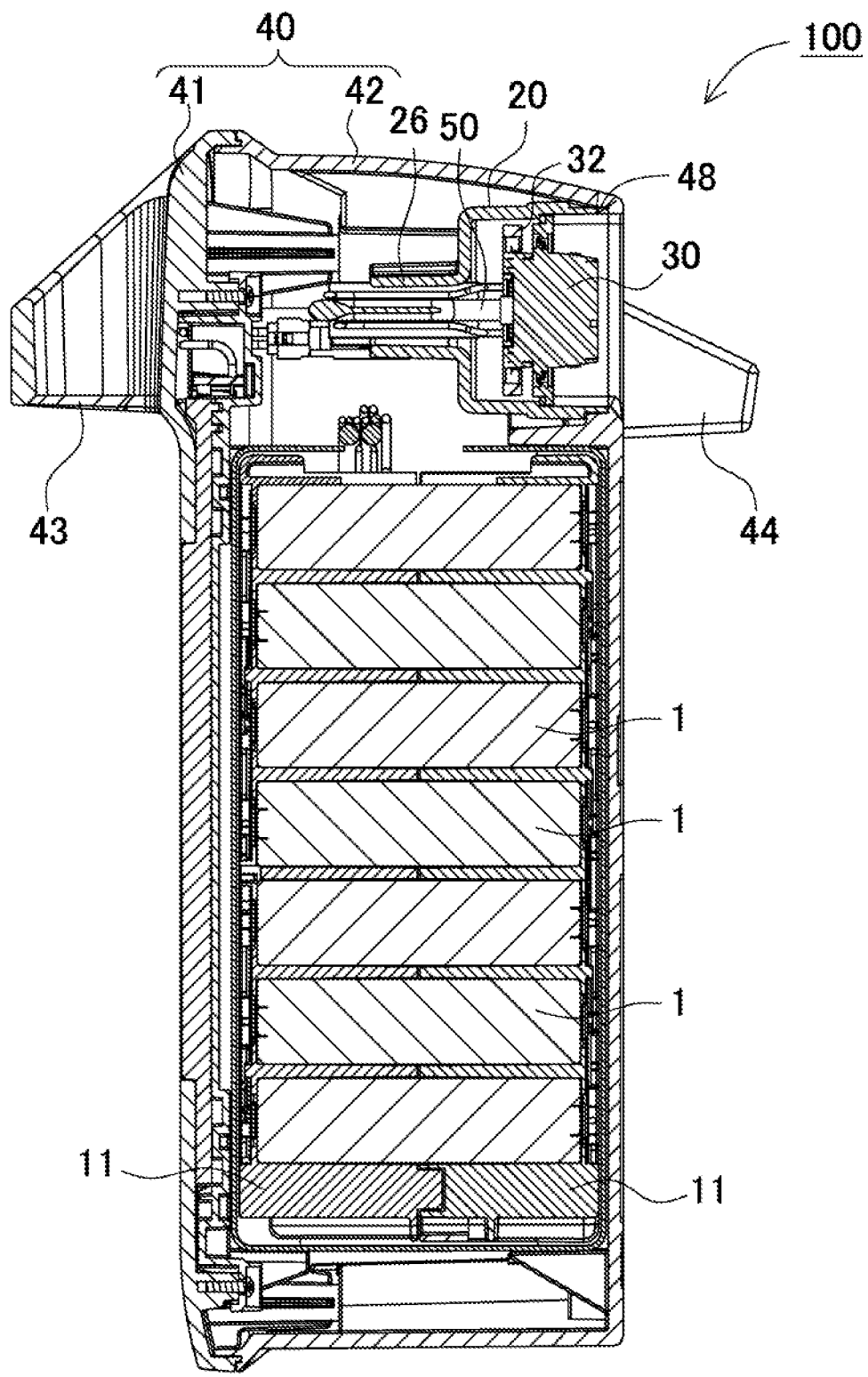
FIG. 4 is a cross-sectional view of the battery pack in FIG. 1 taken along line IV-IV in FIG. 1.
Figure 5:
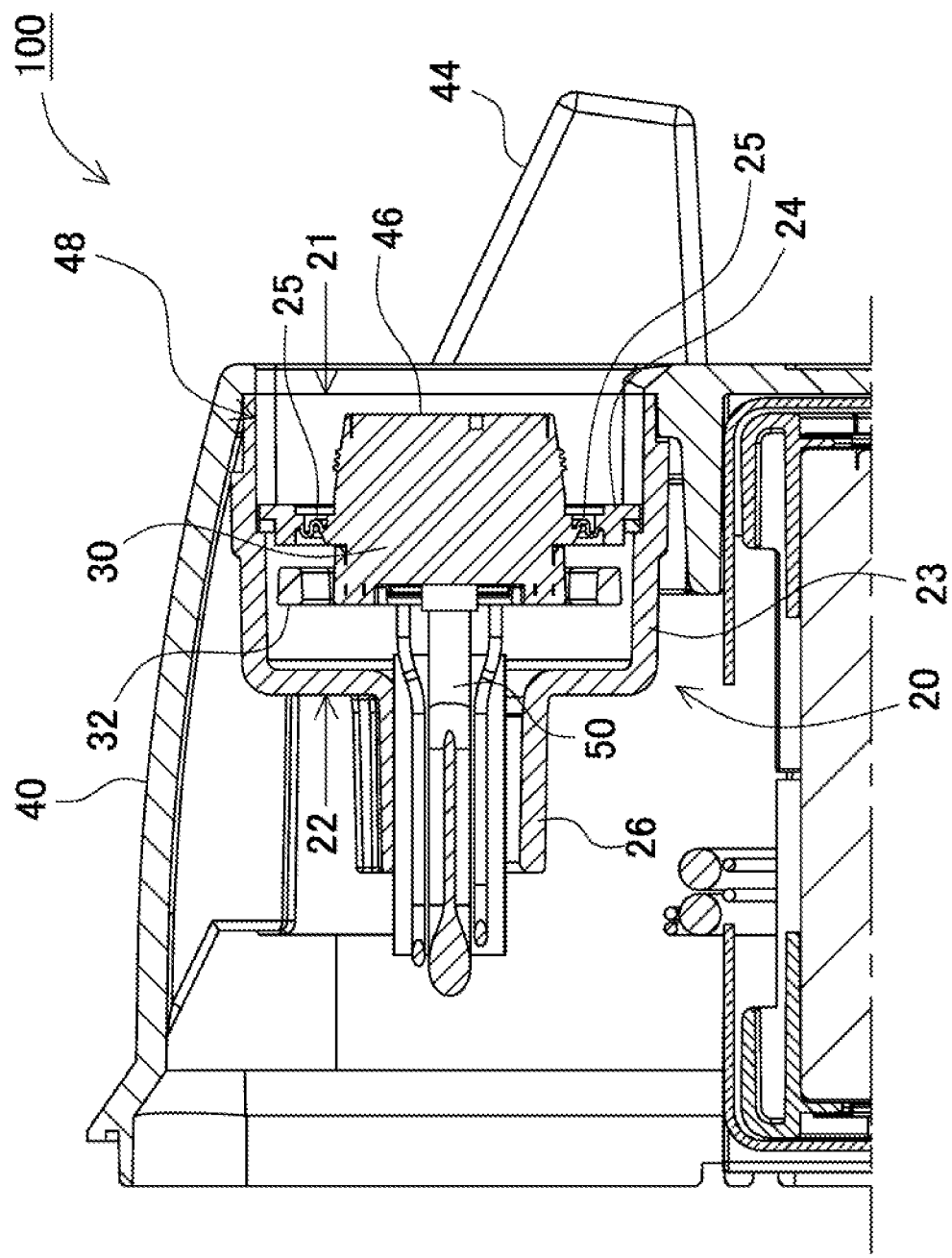
FIG. 5 is an enlarged cross-sectional view of main part that illustrates a floating connector of the battery pack in FIG. 4.
Figure 6:
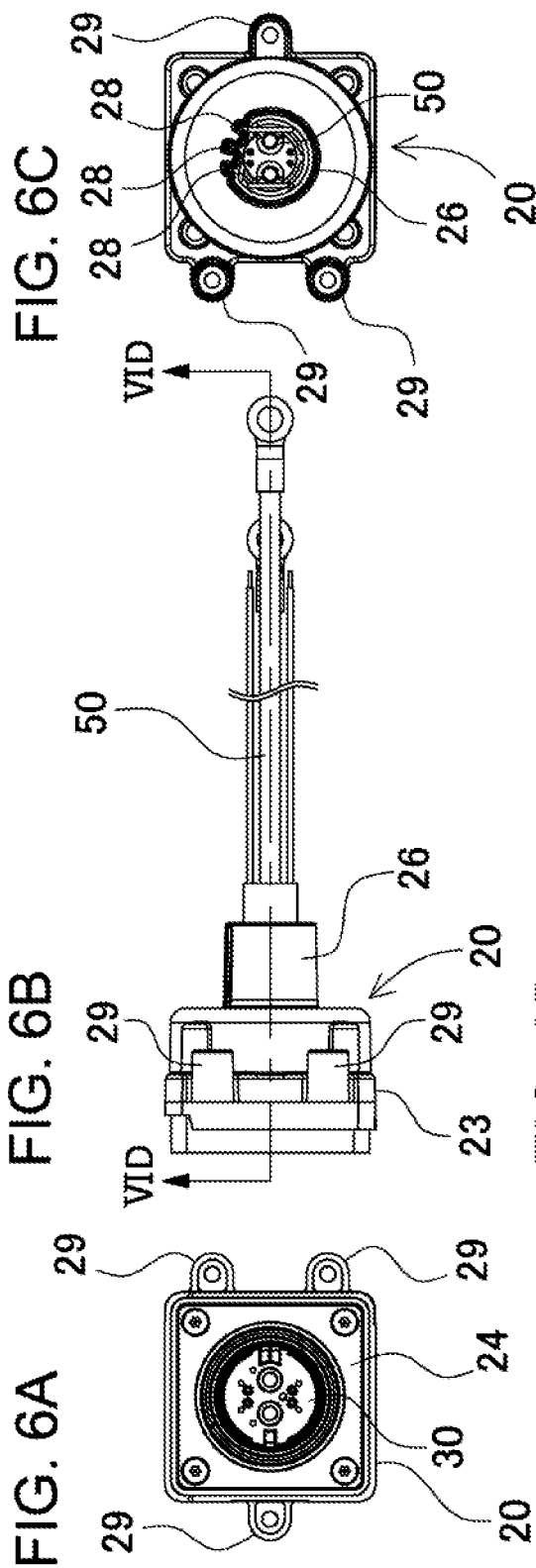
FIG. 6A is a bottom view of the floating connector.
FIG. 6B is a side view of the floating connector.
FIG. 6C is a plan view of the floating connector.
FIG. 6D is a cross-sectional view of the floating connector in FIG. 6B taken along line VID-VID in FIG. 6B.
Figure 7:
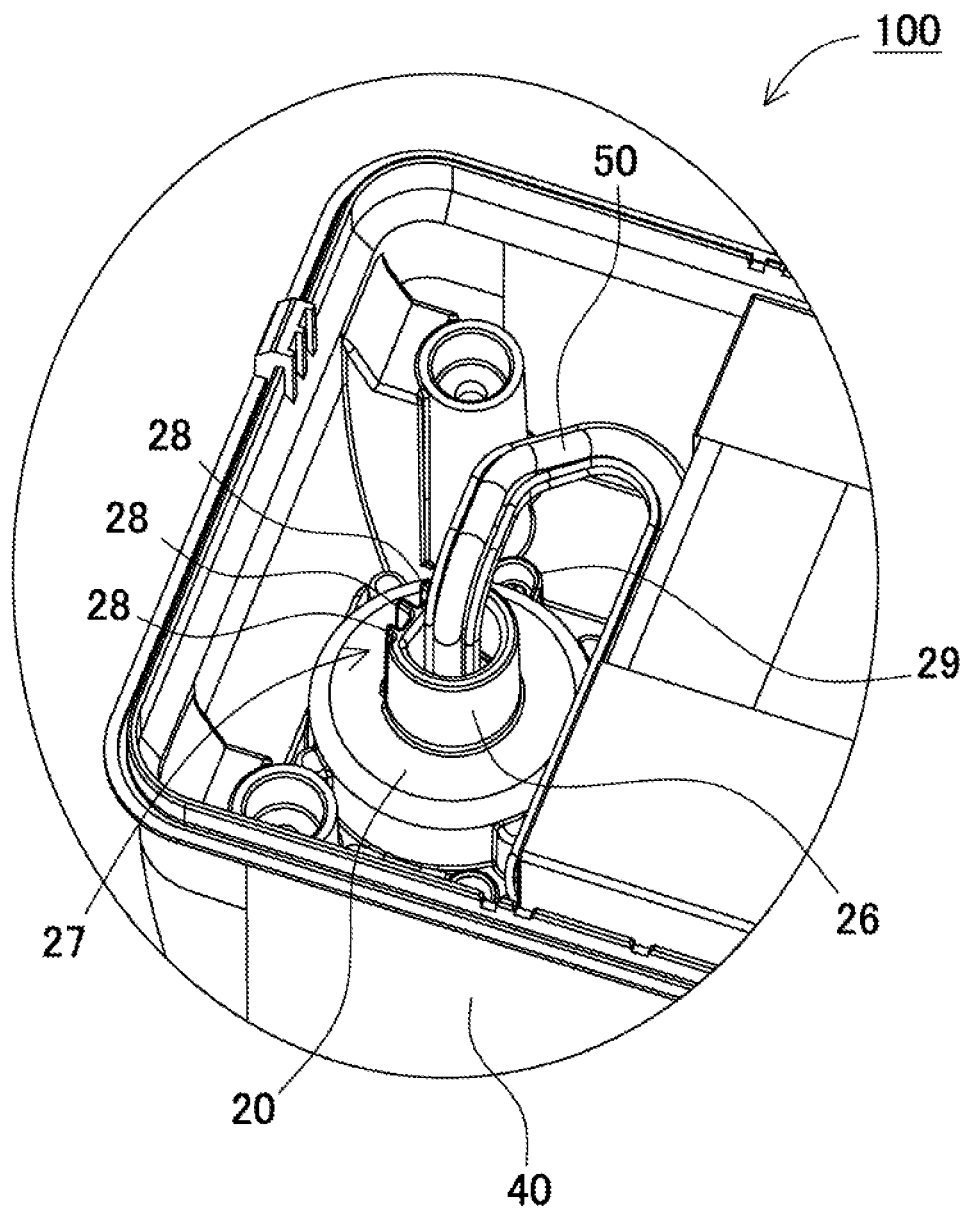
FIG. 7 is a perspective view that illustrates the floating connector in FIG. 5.
Figure 8:
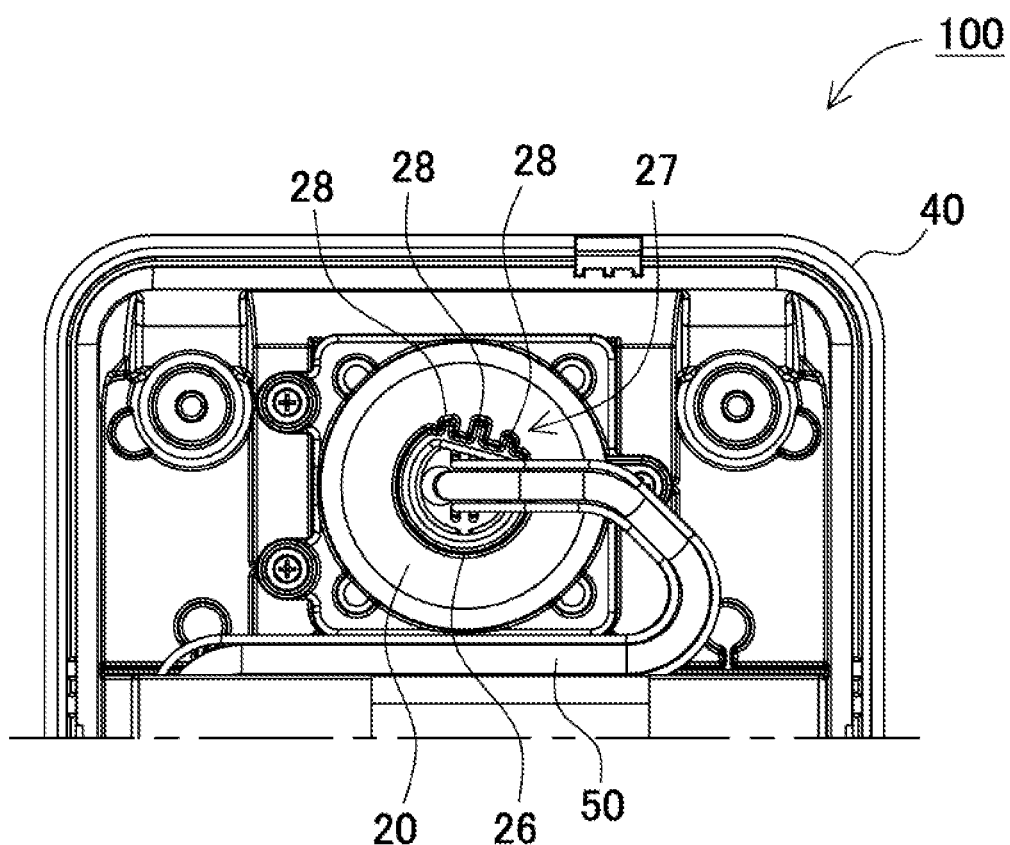
FIG. 8 is a plan view that illustrates the floating connector in FIG. 7.
Figure 9A:
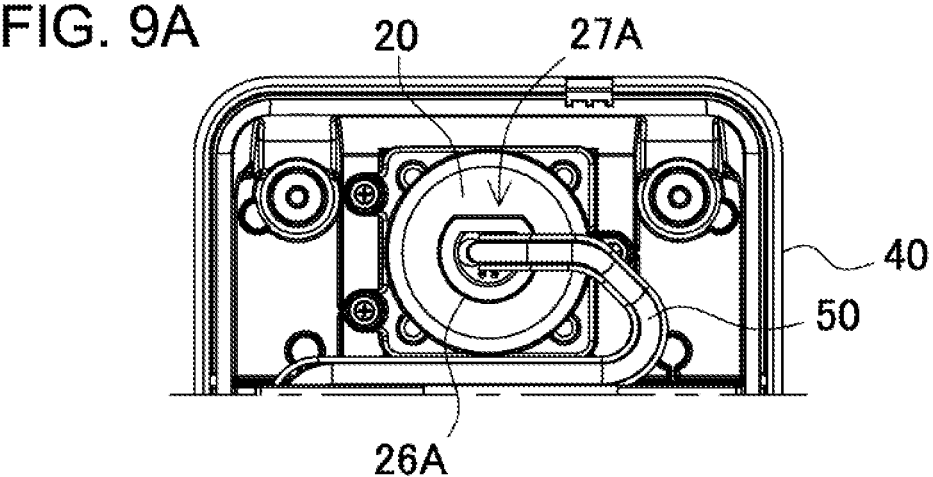
FIG. 9A is a plan view that illustrates an example of a cut-off portion.
Figure 9B:
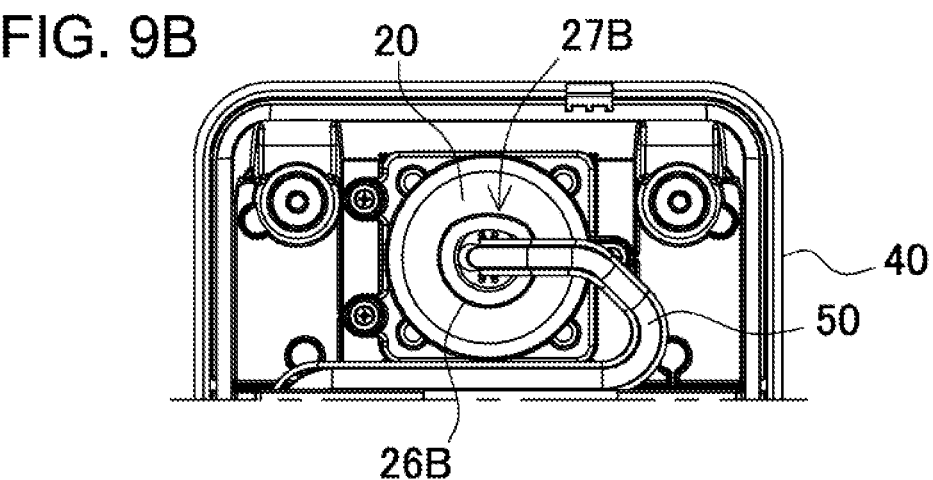
FIG. 9B is a plan view that illustrates another example of a cut-off portion.
Figure 9C:
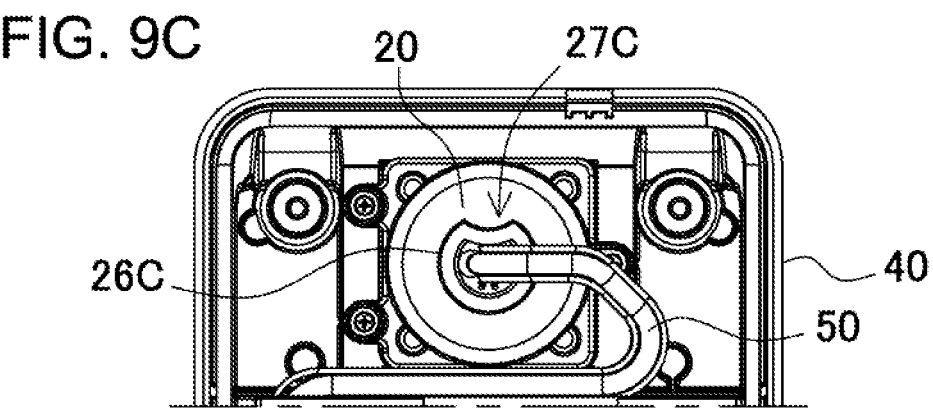
FIG. 9C is a plan view that illustrates another example of a cut-off portion.
Figure 10:
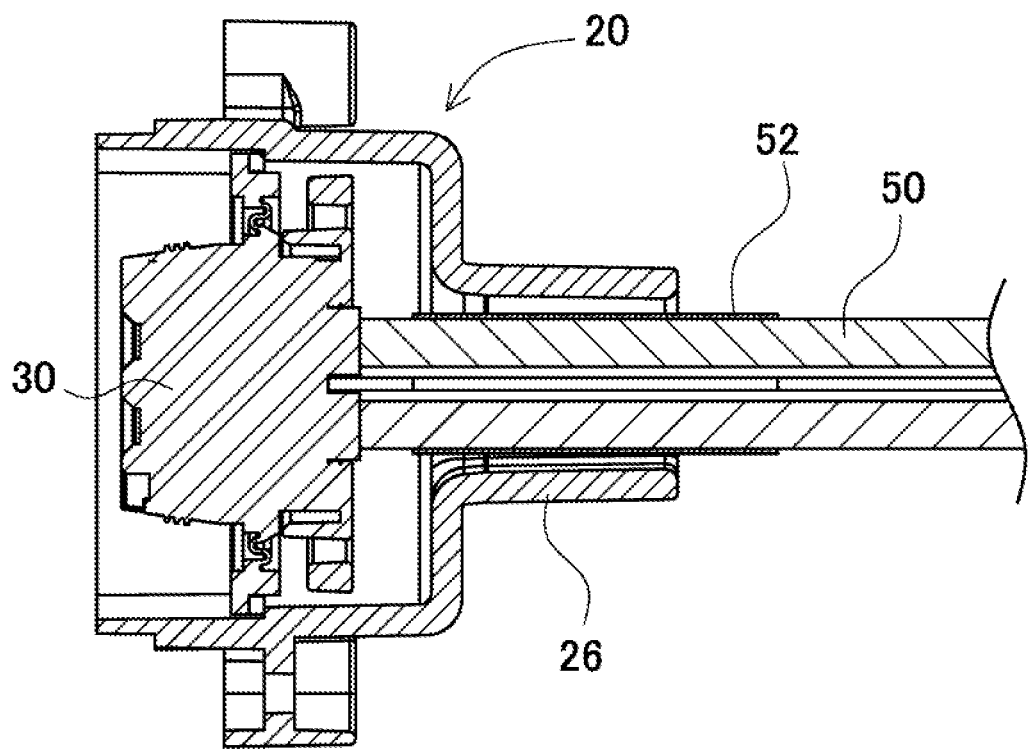
FIG. 10 is a cross-sectional view that illustrates a lead wire according to an example of modification.
Figure 11:
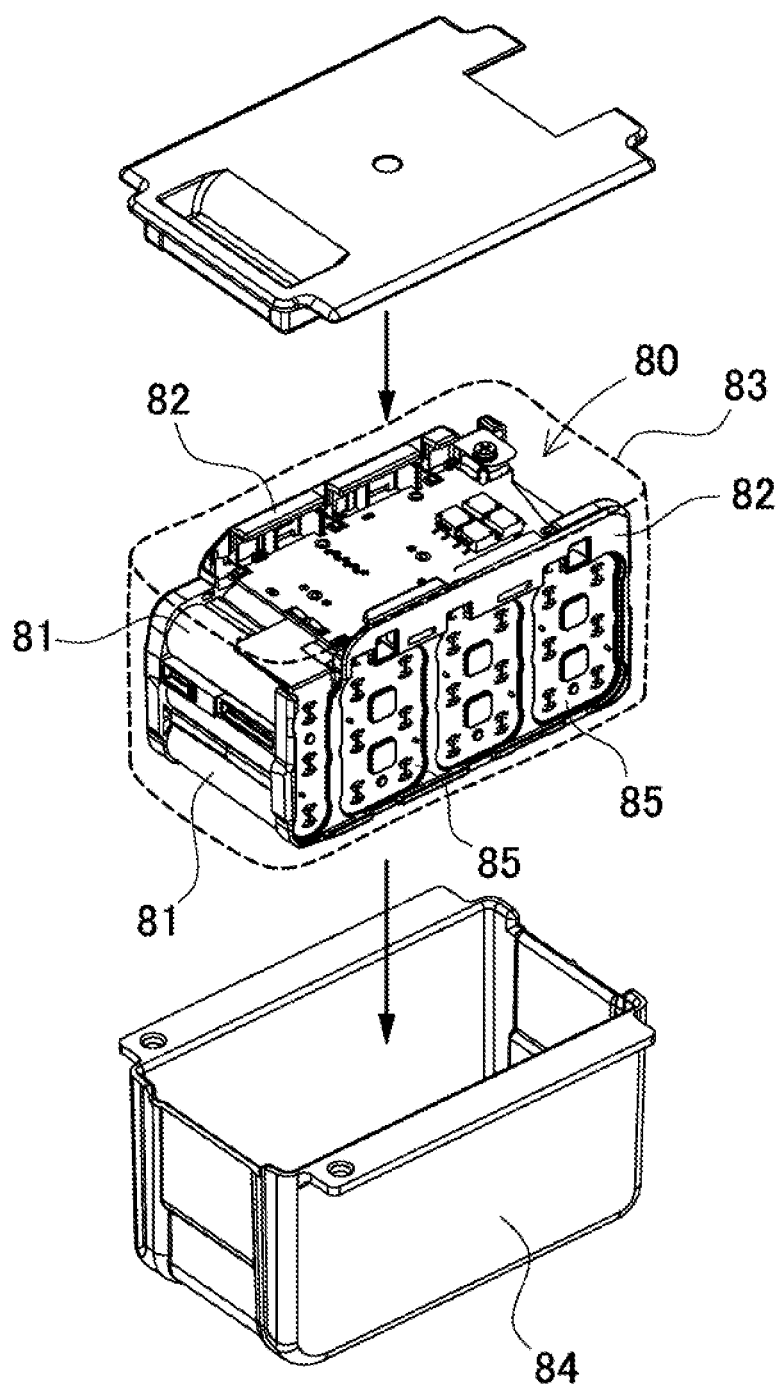
FIG. 11 is an exploded perspective view that illustrates a conventional battery pack.

FIGS. 1 to 10 illustrate a battery pack according to a first exemplary embodiment. FIG. 1 is a perspective view that illustrates an appearance of battery pack 100 according to the first exemplary embodiment. FIG. 2 is a back perspective view of an appearance of battery pack 100 in FIG. 1. FIG. 3 is an exploded perspective view of battery pack 100 in FIG. 2. FIG. 4 is a cross-sectional view of battery pack 100 in FIG. 1 taken along line IV-IV in FIG. 1. FIG. 5 is an enlarged cross-sectional view of main part that illustrates floating connector 30 of battery pack 100 in FIG. 4. FIG. 6A is a bottom view of floating connector 30. FIG. 6B is a side view of floating connector 30. FIG. 6C is a plan view of floating connector 30. FIG. 6D is a cross-sectional view of floating connector 30 in FIG. 6B taken along line VID-VID in FIG. 6B. FIG. 7 is a perspective view that illustrates floating connector 30 in FIG. 5. FIG. 8 is a plan view that illustrates floating connector 30 in FIG. 7. FIG. 9A is a plan view that illustrates an example of cut-off portion 27. FIG. 9B is a plan view that illustrates another example of cut-off portion 27. FIG. 9C is a plan view that illustrates another example of cut-off portion 27. FIG. 10 is a cross-sectional view that illustrates lead wire 50 according to an example of modification.

(Exterior Case 40)

Exterior case 40 has a shape like a box. Exterior case 40 forms a shape of battery pack 100 illustrated in FIGS. 1 and 2. Exterior case 40 has a space inside exterior case 40. Battery module 10 is disposed in the space. Exterior case 40 is divided into lid 41 and main body 42, as illustrated in FIG. 3. The main body has the space. Exterior case 40 is made of a light material that has an excellent insulating property, such as a resin. Exterior case 40 may have handle 43 on a top of exterior case 40, and legs 44 on a bottom of exterior case 40, as necessary. Further, exterior case 40 includes a charging terminal and a discharging terminal in a surface of exterior case 40. In the example, exterior case 40 includes charging terminal 45 in a top of exterior case 40, as illustrated in FIG. 1. Further, exterior case 40 includes discharging terminal 46 in a bottom of exterior case 40, as illustrated in FIG. 2. The terminals may be each covered with a cover, such as a cap. Consequently, surfaces of the terminals are not exposed. In an example in FIG. 1, charging terminal 45 is covered. In the example, charging terminal 45 and discharging terminal 46 are separate from each other. However, the present invention is not limited to the configuration. The charging terminal and discharging terminal 46 may be integrally made.

In examples in FIGS. 2 and 3, exterior case 40 has depression 47 in a surface of exterior case 40. Floating connector 30 is disposed in depression 47. Consequently, floating connector 30 does not protrude from the surface of exterior case 40. Therefore, floating connector 30 is not allowed to accidentally come into contact with an object.

Exterior case 40 includes opening 48, as illustrated in an exploded perspective view of FIG. 3, and cross-sectional views of FIGS. 4 and 5. Connector holder 20 is fixed to opening 48. Floating connector 30 is disposed in depression 47, as described above. Opening 48 is in a bottom of depression 47.

(Battery Module 10)

Battery module 10 is disposed in exterior case 40, as illustrated in a cross-sectional view of FIG. 4. Battery module 10 includes at least one secondary-battery cell 1. The secondary batteries are connected with each other in series and in parallel. Consequently, battery module 10 produces predetermined power, and has a predetermined capacity. Battery module 10 includes battery holder 11, as illustrated in an exploded perspective view of FIG. 3. Battery holder 11 holds a plurality of secondary-battery cells 1. Secondary-battery cells 1 are each cylindrical. Battery holder 11 includes cell retainers. The cell retainers retain ends of respective secondary-battery cells 1. The cell retainers are each cylindrical. When secondary-battery cells 1 are disposed in battery holder 11, surfaces of ends of secondary-battery cells 1 are out of battery holder 11. The surfaces of ends are welded to lead sheets. The lead sheets connect secondary-battery cells 1 with each other in series and in parallel. In an example in FIG. 3, 28 secondary-battery cells 1 are connected with each other. More specifically, four parallel sets of seven secondary-battery cells 1 in series are connected with each other. Shapes and an arrangement of the lead sheets depend on parallel and series connections of secondary-battery cells 1.

The lead sheets are made of a metal that has excellent conductivity. The lead sheets are connected with surfaces of ends of secondary-battery cells 1 by spot welding, for example. The lead sheets are connected with circuit board 3. Circuit board 3 is disposed on a side of battery holder 11. Circuit board 3 includes a circuit that charges and discharges secondary-battery cells 1, and a protection circuit.

Each of secondary-battery cells 1 is a cylindrical battery that includes a cylindrical exterior can. Secondary-battery cells 1 may be lithium-ion secondary batteries, nickel metal hydride secondary batteries, or nickel-cadmium secondary batteries, for example. Lithium-ion secondary batteries are especially preferable because lithium-ion secondary batteries have high energy efficiency per unit of volume. The lead sheets connect electrodes of surfaces of ends of the plurality of secondary-battery cells with each other. Consequently, the plurality of secondary-battery cells are connected with each other in series and in parallel. The present invention is not limited to secondary-battery cells that are cylindrical. Prismatic (rectangular) batteries or pouch batteries may be used.

If battery module 10 is disposed in a waterproof container, battery module 10 becomes waterproof. The waterproof container may be a bag. The waterproof bag is made of a transparent resin, such as polyethylene. If a waterproof function is not necessary for battery module 10, the waterproof bag may be eliminated.

(Connector Holder 20)

Exterior case 40 exposes connector holder 20 through opening 48 of exterior case 40. As illustrated in an enlarged cross-sectional view of FIG. 5, connector holder 20 is fixed to exterior case 40. Connector holder 20 has two main surfaces. First main surface 21 is one of the two main surfaces. First main surface 21 is exposed through opening 48 of exterior case 40. Second main surface 22 is opposite first main surface 21. Second main surface 22 faces an inside of exterior case 40.

(Floating Connector 30)

Floating connector 30 is attached to connector holder 20. Floating connector 30 is a terminal that is able to be connected with a device to which battery pack 100 supplies electrical energy. In the example, floating connector 30 is a discharging terminal. More specifically, exterior case 40 exposes part of a surface of floating connector 30. Discharging terminal 46 is made or disposed on the exposed part of a surface of floating connector 30. If magnetism is used to connect floating connector 30 with a device to which battery pack 100 supplies electrical energy, a magnet or a metallic piece is attached to discharging terminal 46. The magnetic connection allows floating connector 30 to be positioned at an appropriate position. Further, the magnetic connection allows floating connector 30 to continue to be connected with a device to which battery pack 100 supplies electrical energy.

Floating connector 30 has connector base 32 on a back-surface side of floating connector 30. The back-surface side is an inner surface of floating connector 30 that is opposite the exposed part of a surface of floating connector 30. Connector base 32 has a shape like a disk, for example. Lead wire 50 is connected with substantially a center of connector base 32. Lead wire 50 is fixed to substantially a center of floating connector 30. Lead wire 50 is substantially perpendicular to floating connector 30. Lead wire 50 extends through an inside of exterior case 40 and is connected with circuit board 3.

(Floating Mechanism)

Floating connector 30 is connected with connector holder 20 in such a manner that floating connector 30 floats in such a manner that X, Y, and Z axes and an angle of floating connector 30 are variable. FIG. 6A is a bottom view of connector holder 20 connected with floating connector 30. FIG. 6B is a side view of connector holder 20 connected with floating connector 30. FIG. 6C is a plan view of connector holder 20 connected with floating connector 30. FIG. 6D is a cross-sectional view of connector holder 20 connected with floating connector 30. As illustrated in FIGS. 6A to 6D, connector holder 20 has frame 23 that is rectangular. Connector holder 20 is open on a first-main-surface-21 side (a bottom side) of connector holder 20. Therefore, floating connector 30 is exposed. Floating connector 30 is held in frame 23 in such a manner that floating connector 30 floats in such a manner that an orientation (=posture, or attitude) of floating connector 30 is slightly variable. That is to say, an angle of floating connector 30 is variable, and a position of floating connector 30 is adjustable along X, Y, and Z axes. In an example in FIG. 5, holding sheet 24 is fixed to an inner surface of frame 23. Holding sheet 24 is a flat sheet. Holding sheet 24 has an opening in a center of holding sheet 24. Floating connector 30 is disposed in the opening. Connecting component 25 is between floating connector 30 and holding sheet 24. Connecting component 25 is flexible, and is a bellows or rubber, for example. Connecting component 25 connects floating connector 30 with holding sheet 24. Since connecting component 25 deforms, an orientation of floating connector 30 is variable. As described above, floating connector 30 is not completely fixed, but is allowed to slightly move. Therefore, when battery pack 100 is connected with a device to which battery pack 100 supplies electrical energy, a position of floating connector 30 relative to a connector of the device to which battery pack 100 supplies electrical energy is adjustable, and an orientation of floating connector 30 is adjustable. Therefore, battery pack 100 is surely connected with the device to which battery pack 100 supplies electrical energy.

Floating connector 30 is held by connector holder 20 in such a manner that floating connector 30 floats in such a manner that an orientation of floating connector 30 is variable. Further, preferably, floating connector 30 has a restoring force that allows floating connector 30 to return to an original state when an external force is not applied to floating connector 30. When floating connector 30 is in the original state, preferably, floating connector 30 is held horizontally. That is to say, preferably, floating connector 30 is held substantially parallel to a bottom of exterior case 40, and floating connector 30 is held at substantially a center of the opening of holding sheet 24. Consequently, when battery pack 100 is connected with a device to which battery pack 100 supplies electrical energy, floating connector 30 is easily connected with a connector of the device to which battery pack 100 supplies electrical energy. In an example in FIG. 5, floating connector 30 is parallel to a plane of holding sheet 24.

Connector holder 20 and floating connector 30 may be standardized components. Consequently, a conventional floating connector that includes a lead wire becomes usable, and an orientation of the conventional floating connector becomes adjustable. Consequently, the orientation of the conventional floating connector is held at a central original orientation. In an example in FIG. 3, connector holder 20 is standardized and has depression 47. Further, floating connector 30 is standardized and includes lead wire 50 connected with floating connector 30. Floating connector 30 is disposed in depression 47.

In an example in FIG. 6A, frame 23 of connector holder 20 is rectangular. However, a frame may be cylindrical, for example.

(Guide Pipe 26)

Connector holder 20 is closed on a second-main-surface-22 side (a top side) of connector holder 20. Guide pipe 26 connects with substantially a center of the second-main-surface-22 side of connector holder 20. Guide pipe 26 is cylindrical. Frame 23 and guide pipe (tube) 26 are made in such a manner that a space in frame 23 adjoins an inner surface of guide pipe 26. Frame 23 and guide pipe 26 are integrally made. Guide pipe 26 is fixed to second main surface 22 of connector holder 20. Guide pipe 26 is substantially perpendicular to second main surface 22 of connector holder 20. Lead wire 50 fixed to a back surface of connector holder 20 is inserted in guide pipe 26. Consequently, lead wire 50 is substantially vertically held. Therefore, lead wire 50 does not apply bias to floating connector 30 connected with lead wire 50.

Hereinafter, a case will be described in which lead wire 50 connected with floating connector 30 interferes with the floating mechanism. Battery packs need to produce high power in recent years. Consequently, large electric current for charging or discharging flows through a lead wire of each of the battery packs. Therefore, resistances of the lead wires tend to become lower, and thus diameters of the lead wires tend to become larger. Consequently, the lead wires become less flexible. Consequently, a lead wire in some orientation or in some state may apply a force to a floating connector. For example, a lead wire whose end is connected with a floating connector may push or pull the floating connector. That is to say, although a floating connector is used, the floating connector receives an external force from a lead wire connected with the floating connector. Consequently, the floating connector may become inclined from an original state, or may become out of a center. Further, even if an external force is applied to a floating connector, a restoring force of a floating mechanism naturally allows the floating connector to return to an original state after the external force vanishes. For example, even if a floating connector is pushed, a restoring force of a floating mechanism naturally allows the floating connector to return to an original state after the floating connector ceases to be pushed. However, a lead wire may apply a force to the floating connector, as described above. Consequently, the restoring force is weakened. Consequently, the floating connector may not return to the original state. As described above, a lead wire connected with a floating connector may interfere with a floating function.

Figure 12:
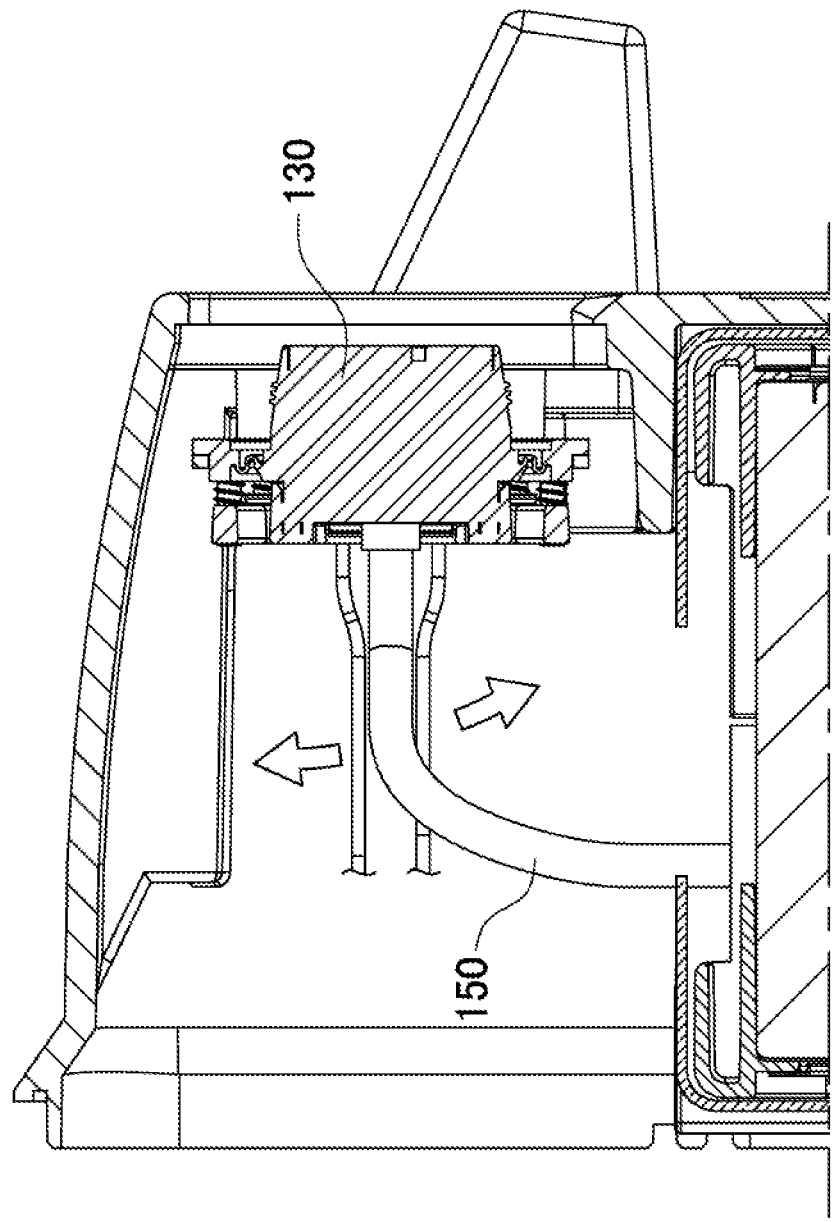
FIG. 12 is a cross-sectional view that illustrates an example of a floating connector according to a comparative example.

In the present exemplary embodiment, however, connector holder 20 has guide pipe 26 on a second-main-surface-22 side of connector holder 20, as illustrated in FIGS. 5, 7, and 8. Guide pipe 26 is cylindrical and surrounds lead wire 50. Guide pipe 26 is substantially perpendicular to the second-main-surface-22 side. Consequently, lead wire 50 that extends from an inner surface of floating connector 30 and extends substantially perpendicularly to the inner surface passes through guide pipe 26. Therefore, floating connector 30 is horizontally held. Lead wire 50 is especially less flexible near a connection between lead wire 50 and floating connector 30. Therefore, the floating connector is likely to be influenced by an angle of part of the lead wire that is near the floating connector. For example, in a comparative example illustrated in FIG. 12, there is no guide pipe, and lead wire 150 that connects floating connector 130 with a circuit board has a minimum length required to connect floating connector 130 with the circuit board. In that case, lead wire 150 is likely to become inclined. Consequently, floating connector 130 connected with an end of lead wire 150 is likely to become inclined. In the present exemplary embodiment, guide pipe 26 is disposed near a connection between lead wire 50 and floating connector 30, as illustrated in FIG. 5. Guide pipe 26 holds lead wire 50 in such a manner that part of lead wire 50 that is near the connection is almost vertical. Consequently, an original state of floating connector 30 is almost horizontal. In other words, even if lead wire 50 applies a force to floating connector 30, guide pipe 26 adjusts an orientation of floating connector 30. Consequently, the orientation of floating connector 30 is horizontally held near the connection between lead wire 50 and floating connector 30.

On the other hand, an inner diameter of guide pipe 26 is larger than an outer diameter of lead wire 50, as illustrated in FIGS. 5, 6D, and 7. Consequently, guide pipe 26 does not interfere with the floating mechanism of floating connector 30. Since an inner diameter of guide pipe 26 is larger than an outer diameter of lead wire 50, a space is formed around lead wire 50. Therefore, lead wire 50 is allowed to slightly move or deform in the space. Therefore, floating connector 30 connected with lead wire 50 is allowed to become inclined or tilt. Therefore, the floating mechanism surely operates.

(Friction Decreasing Mechanisms)

On the other hand, if friction between a surface of lead wire 50 and an inner surface of guide pipe 26 is high, lead wire 50 may become immovable. Consequently, floating connector 30 may not become inclined. Therefore, preferably, friction decreasing mechanisms are disposed that decrease friction between a surface of lead wire 50 and an inner surface of guide pipe 26. In an example illustrated in FIGS. 7 and 8, cut-off portion 27 is an example of the friction decreasing mechanisms. A shape of a cross section of guide pipe 26 that is cylindrical is a circle that has cut-off portion 27. Such a configuration decreases an area of part of a surface of lead wire 50 that is in contact with an inner surface of guide pipe 26 through which lead wire 50 passes. That is to say, if a lead wire whose cross section is circular is in contact with a guide pipe whose cross section is circular, a curved surface of the lead wire is in contact with a curved surface of the guide pipe. Therefore, an area of part of a surface of the lead wire that is in contact with an inner surface of the guide pipe is likely to increase. Cut-off portion 27 of guide pipe 26 decreases an area of part of a surface of the lead wire that is in contact with an inner surface of the guide pipe. Therefore, frictional resistance is decreased.

Ribs 28 may be made on cut-off portion 27. Ribs 28 reinforce guide pipe 26. In an example illustrated in FIGS. 7 and 8, three ribs 28 outward protrude from cut-off portion 27. Guide pipe 26 has a circular cross section. In a plan view, ends of ribs 28 are along the circular cross section. Consequently, guide pipe 26 that has cut-off portion 27 becomes strong.

Preferably, an edge of cut-off portion 27 has a radius of curvature that is larger than a radius of curvature of a circular cross section of guide pipe 26. For example, a surface of an end of cut-off portion 27A of guide pipe 26A has a shape like a straight line whose radius of curvature is infinity, as illustrated in FIG. 9A. Consequently, an area of part of a surface of the lead wire that is in contact with an inner surface of guide pipe 26A is smaller than an area of part of a surface of the lead wire that is in contact with an inner surface of guide pipe 26 that is circular. The present invention is not limited to a cut-off portion that has a shape like a straight line. A cut-off portion may be curved. For example, guide pipe 26B has cut-off portion 27B that is curved, as illustrated in FIG. 9B. Even in that case, an area of part of a surface of the lead wire that is in contact with an inner surface of guide pipe 26B is smaller than an area of part of a surface of the lead wire that is in contact with an inner surface of guide pipe 26B that is circular. Guide pipe 26B provides a space where lead wire 50 is able to move. The space is larger than a space where lead wire 50 is able to move provided by a guide pipe that has a cut-off portion that has a shape like a straight line. Therefore, floating connector 30 is allowed to become more inclined.

In FIG. 9B, the cut-off portion is convex. Alternatively, a cut-off portion may be concave, as illustrated in FIG. 9C. That is to say, cut-off portion 27C may be concave, and may protrude toward an inside of a cylindrical shape of guide pipe 26. In that case, a radius of curvature of cut-off portion 27C is smaller than a radius of curvature of a circle of guide pipe 26. However, an area of part of a surface of the lead wire that is in contact with an inner surface of guide pipe 26C is even smaller than an area of part of a surface of the lead wire that is in contact with an inner surface of guide pipe 26.

Preferably, a position of cut-off portion 27 depends on a position of circuit board 3 to which lead wire 50 is fixed. For example, an edge of guide pipe 26 has cut-off portion 27 at a position of the edge that is far from circuit board 3. The configuration especially allows a length of lead wire 50 to be longer than a minimum length required to connect floating connector 30 with circuit board 3. Consequently, lead wire 50 becomes easily handled. Consequently, assembly becomes more efficient. Further, lead wire 50 is allowed to deform more. Consequently, floating connector 30 becomes surely likely to be inclined. On the other hand, if the lead wire becomes longer, a length of the lead wire is longer than a minimum length required to connect the floating connector with the circuit board. That is to say, the lead wire is curved. In that case, part of the lead wire is in contact with an inner surface of the guide pipe in a direction in which the lead wire is curved. An edge of guide pipe 26 has cut-off portion 27 at a position of the edge that is far from circuit board 3. Consequently, lead wire 50 is in contact with cut-off portion 27. Cut-off portion 27 decreases an area of part of a surface of lead wire 50 that is in contact with an inner surface of the guide pipe. Consequently, lead wire 50 smoothly moves on an inner surface of the guide pipe.

Preferably, cut-off portion 27 is parallel to an edge of circuit board 3. For example, cut-off portion 27A is parallel to an edge of circuit board 3, as illustrated in FIG. 9A. Preferably, cut-off portion 27 is inclined in a direction in which lead wire 50 extends from circuit board 3, as illustrated in FIG. 8. In FIG. 8, lead wire 50 is connected with circuit board 3 at a left side of a top of circuit board 3. Lead wire 50 rightward extends from circuit board 3. Further, lead wire 50 is curved in a shape like a letter "U". Further, lead wire 50 is connected with floating connector 30. That is to say, lead wire 50 rightward extends from circuit board 3. Further, lead wire 50 is curved, and is connected with floating connector 30. In case of the configuration, lead wire 50 is likely to be in contact with a right inner surface of guide pipe 26. Further, as described above, lead wire 50 is long. Therefore, lead wire 50 that extends from circuit board 3 passes guide pipe 26. Further, lead wire 50 is curved, and is connected with floating connector 30. In that case, lead wire 50 is likely to be in contact with an upper inner surface of guide pipe 26. In light of the above description, cut-off portion 27 is likely to be in contact with an upper side and a right side of guide pipe 26. Therefore, the cut-off portion is inclined in a direction in which lead wire 50 extends from circuit board 3. For example, the cut-off portion is inclined downward toward a right in FIG. 8. Consequently, cut-off portion 27 is positioned in such a manner that lead wire 50 that extends from circuit board 3 rubs against cut-off portion 27. Consequently, lead wire 50 is surely in contact with cut-off portion 27. Consequently, lead wire 50 smoothly moves on the guide pipe. Consequently, floating operation becomes smooth.

(Tape 52)

Another example of the friction decreasing mechanisms is tape 52 that has a smooth surface. Tape 52 may be wound around lead wire 50, as illustrated in a cross-sectional view of FIG. 10. Consequently, frictional resistance of a surface of lead wire 50 decreases. Therefore, floating operation is more reliable. Tape 52 is made of a material that has a low coefficient of friction, such as polypropylene.

Lead wire 50 includes not only one lead wire, but also may include a plurality of lead wires. The plurality of lead wires may be made of different materials. Further, the plurality of lead wires may have different thicknesses. In that case, the plurality of lead wires are tied into a bundle with tape 52. Consequently, the plurality of lead wires are easily handled in exterior case 40. Consequently, assembly and maintenance become more efficient. Further, tape 52 is wound around part of lead wire 50 that is in contact with guide pipe 26. Consequently, lead wire 50 smoothly moves on guide pipe 26, as described above. Consequently, frictional resistance decreases. Consequently, floating connector 30 is allowed to surely become inclined.

(Fixing Portions 29)

Connector holder 20 also has fixing portions 29 that allow connector holder 20 to be inserted into opening 48 of exterior case 40 from an inside of exterior case 40, and are used to fix connector holder 20 to opening 48 of exterior case 40 from an inside of exterior case 40. Consequently, a relay connector is not necessary. The relay connector is necessary if connector holder 20 is fixed to exterior case 40 from an outside of exterior case 40. Therefore, lead wire 50 is preliminarily welded to floating connector 30. Then lead wire 50 welded to floating connector 30 is directly connected with circuit board 3.

Figure 13:
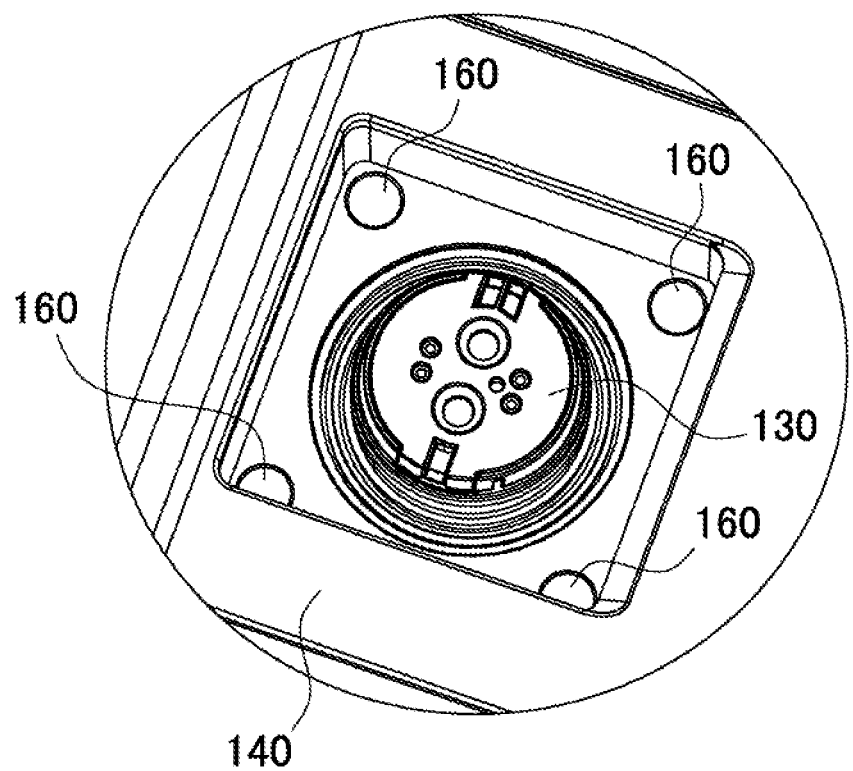
FIG. 13 is an enlarged perspective view that illustrates a floating connector fixed to an exterior case.

In an enlarged perspective view of FIG. 13, floating connector 130 is directly fixed to exterior case 140 from an outside of exterior case 140. Floating connector 130 is directly fixed to exterior case 140 with screws 160. In that case, a relay connector is necessary to electrically connect a lead wire in exterior case 140. Consequently, a cost increases. If a battery pack needs to produce high power and large electric current flows, a connector for large electric current is necessary. If a battery pack needs to be waterproof, a waterproof connector is used. Consequently, a cost further increases. In the present exemplary embodiment, fixing portions 29 are used to fix connector holder 20 to exterior case 40 from an inside of exterior case 40. Therefore, such a relay connector is not necessary. Further, exterior case 40 is assembled in a last step of assembly. Therefore, the assembly becomes efficient. Known structures for fixing are appropriately used for fixing portions 29. For example, screw holes are used to screw connector holder 20 to exterior case 40 from an inside of exterior case 40 with screws 60, as illustrated in FIG. 3.

(Production Method for Battery Pack 100)

Finally, a production method for battery pack 100 will be described. First, battery module 10 and circuit board 3 are arranged in exterior case 40. Lead wire 50 extends from circuit board 3. Lead wire 50 is inserted into guide pipe 26. Guide pipe 26 is cylindrical. Guide pipe 26 is part of connector holder 20, and is on a second-main-surface-22 side of connector holder 20. After lead wire 50 is inserted into guide pipe 26, lead wire 50 is connected with floating connector 30. Then connector holder 20 is inserted into opening 48 of exterior case 40 from an inside of exterior case 40. Then connector holder 20 is fixed to opening 48 of exterior case 40 from an inside of exterior case 40. Then exterior case 40 is closed. Consequently, lead wire 50 passes through guide pipe 26. Consequently, guide pipe 26 of connector holder 20 adjusts a position of floating connector 30. Consequently, floating connector 30 is held at a center. Consequently, lead wire 50 is less likely to push floating connector 30. Consequently, the floating function is less likely to be weakened. Consequently, the floating function is effective. Consequently, battery pack 100 is surely flexibly connected with a device to which battery pack 100 supplies electrical energy.

INDUSTRIAL APPLICABILITY

A battery pack and a production method for a battery pack according to an aspect of the present invention are suitably used as power sources for electric tools, electric bicycles, electric motorcycles, hybrid electric vehicles, and electric vehicles. Further, the battery pack and the production method for a battery pack according to an aspect of the present invention are suitably used as power sources used to store electricity at home and stores.

The invention claimed is:

1. A battery pack comprising:
a battery module that includes at least one secondary-battery cell;
an exterior case that holds the battery module and has an opening;
a circuit board electrically connected with the secondary-battery cell of the battery module;
a connector holder that is fixed to the exterior case and has two main surfaces that include a first main surface exposed through the opening of the exterior case, and a second main surface that is opposite the first main surface and faces an inside of the exterior case;
a floating connector connected with a center of the connector holder in such a manner that the floating connector floats in such a manner that an orientation of the floating connector is variable upward, downward, leftward, and rightward, the floating connector having an exposed surface exposed by the exterior case, and the floating connector being able to be connected through the exposed surface with a device to which the battery pack supplies electrical energy; and
a lead wire fixed to an inner surface of the floating connector that is opposite the exposed surface of the floating connector, the lead wire extending through an inside of the exterior case, and the lead wire connecting the floating connector with the circuit board,
wherein the connector holder has a guide pipe on a side of the second main surface of the connector holder, the guide pipe has a pipe shape, and the guide pipe surrounds the lead wire, and
a shape of an edge of the guide pipe is a circle, has a cut-off portion, and the cut-off portion has a radius of curvature that is larger than a radius of curvature of the circle.

2. The battery pack according to claim 1, wherein the lead wire is fixed to a center of the inner surface of the floating connector, and the lead wire is perpendicular to the inner surface of the floating connector.

3. The battery pack according to claim 1, wherein the cut-off portion has a share of a straight line, or is curved.

4. The battery pack according to claim 1, wherein in the edge of the guide pipe, the cut-of portion is located at a side of the edge that is far from the circuit board.

5. The battery pack, according to claim 4, wherein the cut-off portion of the edge of the guide pipe is inclined in a direction in which the lead wire extends from the circuit board.

6. The battery pack according to claim 1, wherein the connector holder has a frame, the frame adjoins the guide pipe, the frame has an inner diameter that is larger than an inner diameter of the guide pipe, and the frame surrounds the floating connector.

7. The battery pack according to claim 1, wherein the connector holder has a fixing portion that allows the connector holder to be inserted into the opening of the exterior case from an inside of the exterior case, and is used to fix the connector holder to the opening of the exterior case from an inside of the exterior case.

8. The battery pack according to claim 1, wherein the lead wire includes a plurality of wires.

9. The battery pack according to claim 1, wherein a tape that has a smooth surface is wound around the lead wire.

10. A production method for a battery pack, the battery pack including:
a battery module that includes at least one secondary-battery cell;
an exterior case that holds the battery module and has an opening;
a circuit board electrically connected with the secondary-battery cell of the battery module;
a connector holder that is fixed to the exterior case and has two main surfaces that include a first main surface exposed through the opening of the exterior case, and a second main surface that is opposite the first main surface and Faces an inside of the exterior case;

a floating connector connected with the connector holder in such a manner that the floating connector floats in such a manner that an angle of the floating connector is variable, the floating connector being able to be connected with a device to which the battery pack supplies electrical energy; and a lead wire that extends through an inside of the exterior case, and connects the floating connector with the circuit board, the production method for a battery pack comprising, arranging the battery module and the circuit board in the exterior case, inserting the lead wire that extends from the circuit board into a guide pipe having a pipe shape, the guide pipe being formed on a side of the second main surface of the connector holder, a shape of an edge of the directing tube being a circle that has a cut-off portion having a radius of curvature that is larger than a radius of curvature of the circle, connecting the lead wire that has been inserted into the guide pipe with the floating connector, inserting the connector holder into the opening of the exterior case from an inside of the exterior case to fix, closing the exterior case.

\* \* \* \* \*